US007222136B1

(12) United States Patent
Brown et al.

(10) Patent No.: US 7,222,136 B1
(45) Date of Patent: May 22, 2007

(54) COMMUNICATING DATA DICTIONARY INFORMATION OF DATABASE OBJECTS THROUGH A REDO STREAM

(75) Inventors: Archie W. Brown, Milford, NH (US); Raymond Guzman, Amherst, NH (US); Richard L. Frank, Groton, MA (US); Goutam D. Kulkarni, Nashua, NH (US); Joydip Kundu, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 392 days.

(21) Appl. No.: 10/153,034

(22) Filed: May 23, 2002

(51) Int. Cl.
*G06F 17/30* (2006.01)
(52) U.S. Cl. ...................... 707/202; 707/204
(58) Field of Classification Search ............... 707/202, 707/204
See application file for complete search history.

(56) References Cited

U.S. PATENT DOCUMENTS

| | | | | |
|---|---|---|---|---|
| 5,787,251 A | * | 7/1998 | Hamilton et al. | 709/203 |
| 5,799,305 A | * | 8/1998 | Bortvedt et al. | 707/10 |
| 5,991,772 A | * | 11/1999 | Doherty et al. | 707/202 |
| 5,996,054 A | * | 11/1999 | Ledain et al. | 711/203 |
| 6,065,018 A | * | 5/2000 | Beier et al. | 707/202 |
| 6,618,822 B1 | * | 9/2003 | Loaiza et al. | 714/20 |

OTHER PUBLICATIONS

Oracle8/, Administrator's Guide, Release 2(8.1.6); Dec. 1999; Part No. A76956-01.

* cited by examiner

*Primary Examiner*—Jeffrey Gaffin
*Assistant Examiner*—CamLinh Nguyen
(74) *Attorney, Agent, or Firm*—Bingham McCutchen LLP

(57) ABSTRACT

A system, method, and computer program product communicate data dictionary information of database objects through a redo stream in the form of metadata, which provides the association between the internal numbers used by a database schema to identify database objects and the corresponding user-defined names of the database objects, in the redo stream itself, so that the association information may be easily and quickly used in the analysis of the redo stream of the database transactions. A method of communicating data dictionary information of database objects through a redo stream comprises the steps of performing a change to a first database data table, logging redo information representing the change to the first database data table to a redo stream, and logging information relating to internal identifier mapping information associated with the first database data table to the redo stream.

33 Claims, 6 Drawing Sheets

600

COMMUNICATING DATA DICTIONARY INFORMATION OF DATABASE OBJECTS THROUGH A REDO STREAM

FIELD OF THE INVENTION

The present invention relates to providing metadata relating to the association between the internal numbers used by a database schema to identify database objects and the corresponding user-defined names of the database objects in the redo stream itself.

BACKGROUND OF THE INVENTION

The occurrence of a hardware, software, network, process, or system failures in a database system could result in corruption, inconsistencies, or errors to database data. To prevent such problems from occurring, many database systems implement recovery mechanisms capable of restoring the database to a consistent and error-free state if such failures are detected. Recovery mechanisms typically utilize one or more recovery logs or recovery files (collectively referred to herein as "recovery logs") to perform the recovery process. Recovery logs record information about the database data, such as changes to the database data or the state of database data as of a certain point in time.

A commonly implemented recovery log is a "redo log" or "redo stream". Redo streams contain records of all changes made to objects in a database system, regardless of whether the changes are committed or uncommitted. For example, the redo log may record a stream of data containing the identity of each data item that changed in the database, as well as the precise change that is made to the data item. If a failure occurs, the redo stream can be used during the recovery process to "redo" any changes that occurred prior to the failure, to place the database in a consistent state as of a specific point in time.

Since recovery logs, such as redo logs or streams, effectively become a historical repository for all changes made to the database data, the information recorded in the recovery logs can be used for many purposes beyond just system recovery operations. For example, the redo stream information may be used to drive asynchronous applications that provide a variety of functionality, such as:

Logical Standby where a standby database shadows a primary database by extracting committed transactions out of the redo stream and applying them;

Log Based replication where a replica site extracts committed changes made to the tables of interest and applies them to keep the replica tables synchronized; and Log Analysis whereby a user issues Structured Query Language (SQL) queries against a fixed view to determine changes applied to the database.

For example, the redo stream may be analyzed by processing each record in the redo stream to reconstruct the equivalent Data Manipulation Language (DML) statement. DMLs belonging to the same transaction are grouped together and committed transactions are returned to the application.

However, since redo records only identify the modified schema objects (or the associated columns) by internally generated numbers, log analysis and subsequent application of transactions generate output that is not easily readable by a person. In order to produce output that is more easily readable by a person, a data dictionary may be used to provide the mapping between the numbers and the corresponding user defined names. For example, Structured Query Language (SQL) statements use column names and table names that typically have meaning to a person, while the internal database schema identifies the corresponding columns and tables with internally generated numbers.

Thus, the need arises to generate and utilize a data dictionary to provide the mapping between the internal numbers and the corresponding user defined names so that applications that utilize the redo stream can generate output that is more easily readable by a person. One conventional technique saved the data dictionary information in a file that was separate from the redo stream. Use of this data dictionary then required the entries in the data dictionary to be temporally matched with the entries in the redo stream, which was a difficult and time-consuming process.

The need arises for a technique by which information needed to provide data dictionary information of database objects relating to the association between the internal numbers used by a database schema to identify database objects and the corresponding user-defined names of the database objects may be generated so that the association information may be easily and quickly used in the analysis of a redo stream of the database transactions.

SUMMARY OF THE INVENTION

The present invention is a system, method, and computer program product that provide data dictionary information of database objects in the form of metadata, which provides the association between the internal numbers used by a database schema to identify database objects and the corresponding user-defined names of the database objects, in the redo stream itself, so that the association information may be easily and quickly used in the analysis of the redo stream of the database transactions.

In one embodiment of the present invention, a method of communicating data dictionary information of database objects through a redo stream, comprising the steps of logging information relating to internal identifier mapping information associated with a first database data table to the redo stream, processing a transaction related to the first database data table, and logging redo information representing changes to the first database data table caused by processing of the transaction to the redo stream. The step of processing a transaction related to the first database data table may comprise the steps of receiving data manipulation language statements representing a transaction, and performing the data manipulation language statements to cause a change to a first database data table. The step of logging redo information representing changes to the first database data table caused by processing of the transaction to the redo stream may comprise the steps of generating redo information representing the change to the first database data table, and logging the redo information representing the change to the first database data table to the redo stream. The step of logging information relating to internal identifier mapping information associated with the first database data table to the redo stream may comprise the steps of inserting information relating to internal identifier mapping information associated with the first database data table into a second database data table and logging the information representing the information inserted into the second database data table to the redo stream.

In one aspect of the present invention, the information relating to internal identifier mapping information comprises information relating to mapping information from internal identifiers of schema objects of the database to user readable information relating to the schema objects of the database.

The user readable information may comprise at least one of a name of a schema object of the database and a datatype of a schema object of the database.

In one aspect of the present invention, the information relating to internal identifier mapping information comprises metadata. The metadata may comprise information relating to mapping information from internal identifiers of schema objects of the database to user readable information relating to the schema objects of the database. The user readable information may comprise at least one of a name of a schema object of the database and a datatype of a schema object of the database.

In one aspect of the present invention, the method further comprises the step of processing the redo stream. The step of processing the redo stream may comprise the steps of analyzing the information in the redo relating to the information representing the information inserted into the second database data table to generate a data dictionary table, and using the data dictionary table to supply a mapping between internal identifiers of schema objects of the database and user readable information relating to the schema objects of the database. The user readable information may comprise at least one of a name of a schema object of the database and a datatype of a schema object of the database. The information relating to internal identifier mapping information may comprise metadata.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention is a system, method, and computer program product that provide metadata, which provides the association between the internal numbers used by a database schema to identify database objects and the corresponding user-defined names of the database objects, in the redo stream itself, so that the association information may be easily and quickly used in the analysis of the redo stream of the database transactions.

Figure 1:
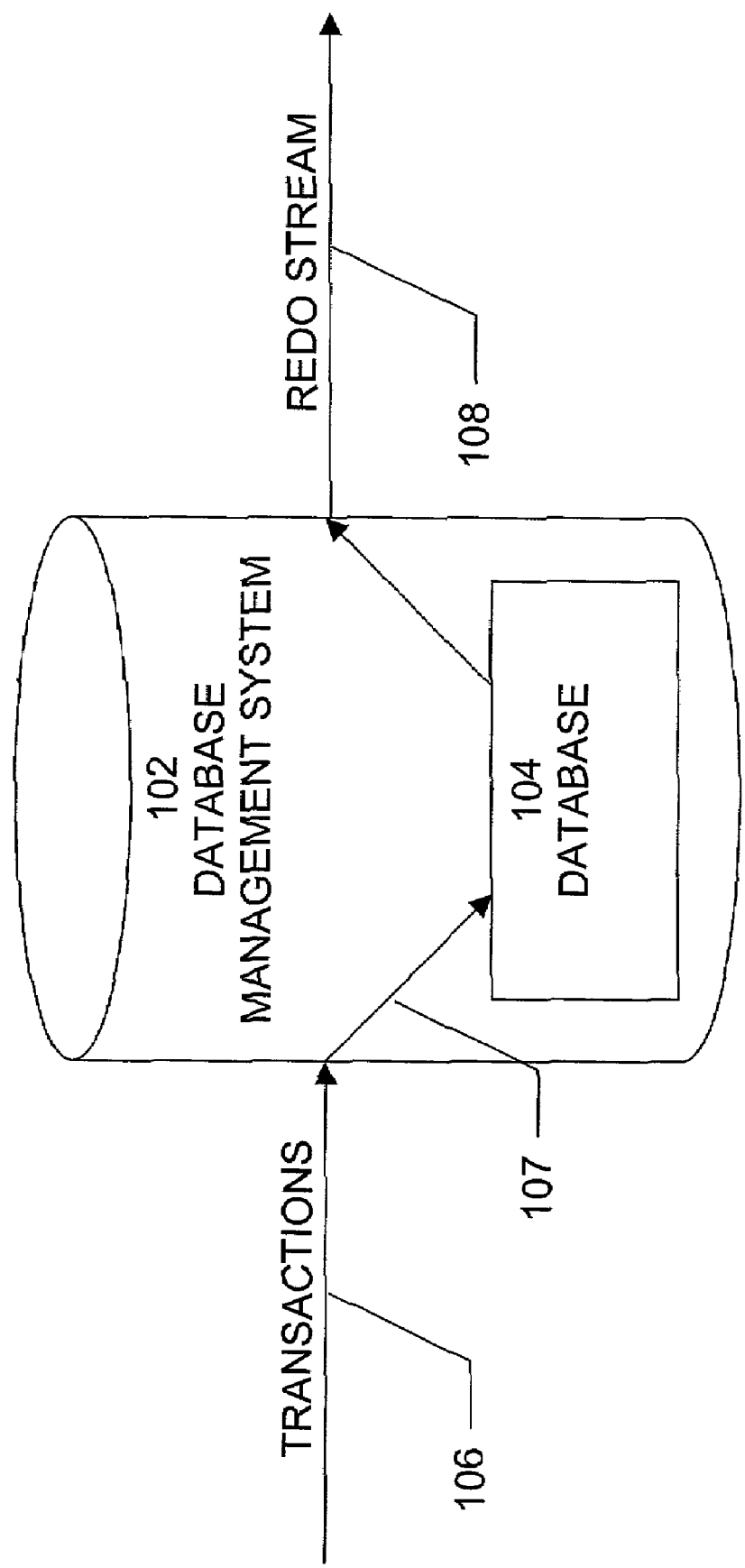
FIG. 1 shows an exemplary database management system (DBMS), in which the present invention may be implemented.

An exemplary database management system (DBMS) 102, in which the present invention may be implemented, is shown in FIG. 1. Database management system (DBMS) 102 provides the capability to store, organize, modify, and extract information from one or more databases included in DBMS 102. From a technical standpoint, DBMSs can differ widely. The terms relational, network, flat, and hierarchical all refer to the way a DBMS organizes information internally. The internal organization can affect how quickly and flexibly you can extract information.

Each database included in DBMS 102 includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database includes not only data, but also low-level database management functions, which perform accesses to the database and store or retrieve data from the database. Such functions are often termed queries and are performed by using a database query language, such as Structured Query Language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in posing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

DBMS 102 may also include one or more database applications, which are software that implements a particular set of functions that utilize one or more databases. Examples of database applications include:

computerized library systems
automated teller machines
flight reservation systems
computerized parts inventory systems Typically, a database application, includes data entry functions and data reporting functions. Data entry functions provide the capability to enter data into a database. Data entry may be performed manually, by data entry personnel, automatically, by data entry processing software that receives data from connected sources of data, or by a combination of manual and automated data entry techniques. Data reporting functions provide the capability to select and retrieve data from a database and to process and format that data for other uses. Typically, retrieved data is used to display information to a user, but retrieved data may also be used for other functions, such as account settlement, automated ordering, numerical machine control, etc.

DBMS 102 includes one or more databases, such as database 104. Database 104 includes one or more data tables. One or more streams of transactions, such as transaction stream 106, are input to DBMS 102. A transaction is any database operation that may result in a change to database 104 or to the data stored in database 104. Each transaction includes one or more Data Manipulation Language (DML) statements 107, which are used to store, retrieve, modify, and erase data from database 104. The performance of the DML statements 107 making up each transaction results in changes being made to the data stored in database 104. These changes are used to generate redo stream 108, which may be output from DBMS 102. Redo stream 108 includes a plurality of redo records, in which each redo record specifies one or more changes that were made to the database or to the data stored in the database.

Transaction stream 106 includes a plurality of transactions, which include commands and/or statements that cause the performance of database operations that may result in a change to database 104 or to the data stored in database 104. The commands and/or statements included in transaction stream 106 may be DML statements, or they may be higher-level commands, such as Application Program Interface (API) calls. Where transaction stream 106 includes API calls, these calls typically are converted to DML statements 107, in order for the transactions to be performed. Where transaction stream 106 includes DML statements, in some embodiments, the DML statements may be performed directly, while in other embodiments, the DML statements may be converted to lower-level DML statements, which are then performed. For example, in some embodiments, transaction stream 106 may include DML statements, such as SQL statements, the SQL statements may be performed directly. In other embodiments, transaction stream 106 may include DML statements, such as SQL statements, but the SQL statements are converted to lower-level DML statements, which are then performed.

Typically, the redo records included in redo stream 108 are processed to reconstruct the equivalent DML statement that produced them. DML statements belonging to the same transaction are grouped together and committed transactions are returned to the application. Since redo records identify the database objects affected by the transactions by internally generated numbers, in order to perform log analysis and subsequent application of transactions, a data dictionary is needed to provide the mapping between the internally generated numbers and the corresponding user defined names. For example, Structured Query Language (SQL) statements use column names and table names that typically have meaning to a person, while the internal database schema identifies the corresponding columns and tables with internally generated numbers.

Figure 2:
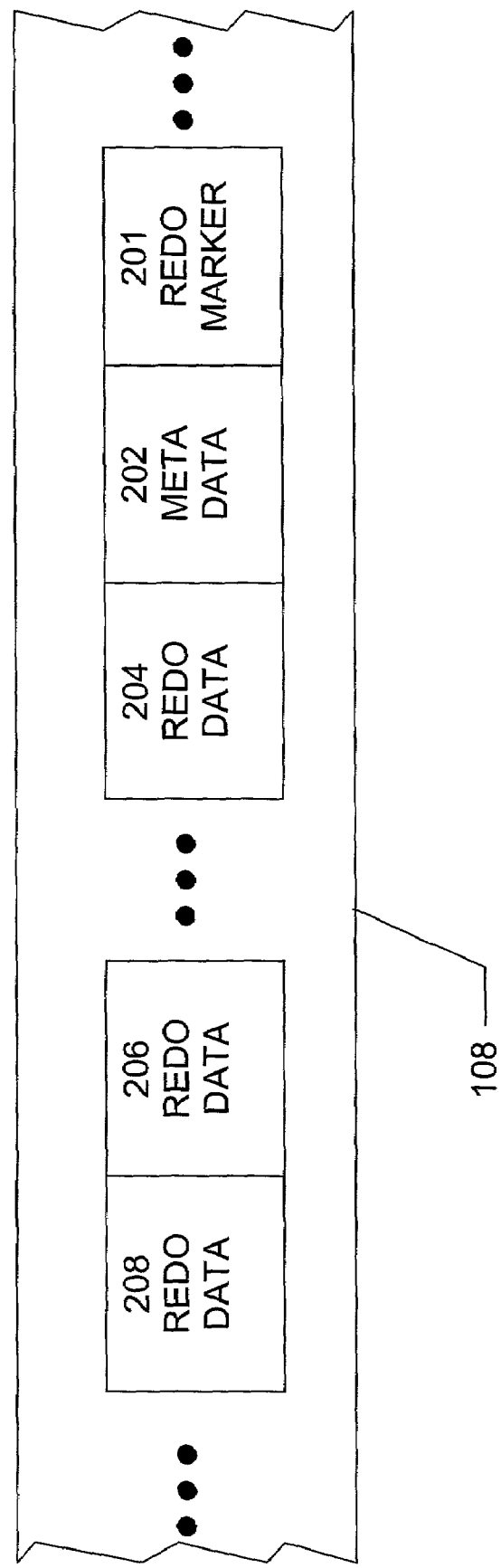
FIG. 2 is an exemplary format of a redo stream generated by the present invention.

The present invention includes in redo stream 108 metadata that provides the mapping between the internally generated numbers and the corresponding user defined names, as shown in FIG. 2. As shown in FIG. 2, redo stream 108 includes redo marker 201 and metadata, such as metadata 202, that provides the mapping between the internally generated numbers and the corresponding user defined names. Redo marker 201 indicates that metadata 202 is present in redo stream 108 and preferably, immediately follows redo marker 201. Redo marker 201 is generated upon performance of the procedure that causes the generation of metadata 202. Redo stream 108 also includes redo data, such as redo data 204, 206, 208, etc., that is generated by processing transactions in DBMS 102.

Figure 3:
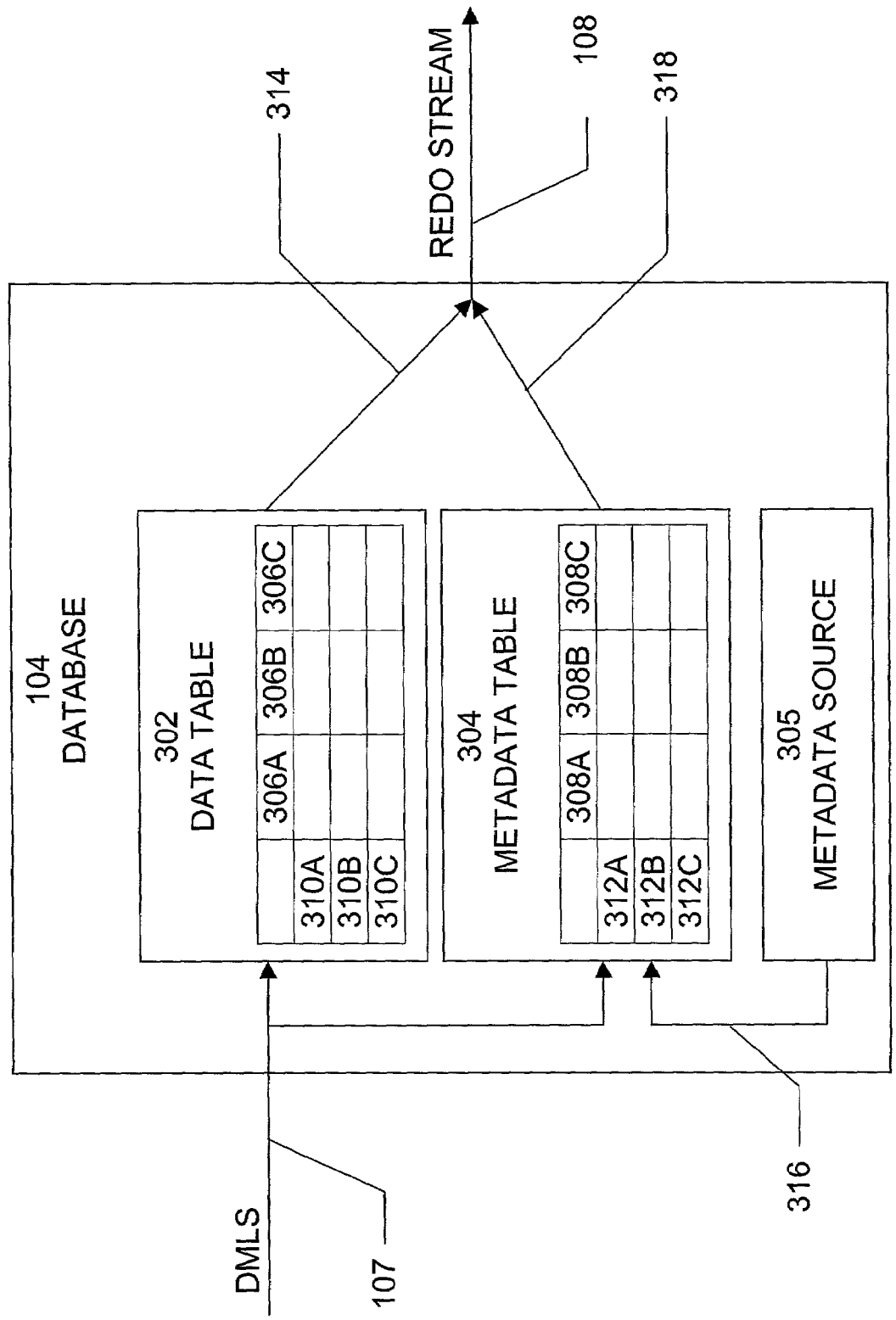
FIG. 3 is an exemplary data flow diagram of the generation of metadata used by the present invention.

An example of a technique by which metadata that provides the mapping between the internally generated numbers and the corresponding user defined names may be generated and included in the redo stream is shown in FIG. 3. As shown in FIG. 3, database 104 include one or more data tables, such as data table 302, and one or more metadata tables, such as metadata table 304. A table, such as data table 302 or metadata table 304, is a basic unit of storage in a relational or object-relational database system. Each table typically comprises one or more rows and columns, such as columns 306A–C of data table 302 and columns 308A–C of metadata table 304 and rows 310A–C of data table 302 and rows 312A–C of metadata table 304. Each column is typically associated with a column name and a column datatype. A row comprises a set of related column data, and normally corresponds to a single database record.

DMLs 107 specify actions that are performed that cause changes to data table 302. The performance of DMLs 107 generates redo records 314, which are included in redo stream 108. In order to include metadata in redo stream 108, the database executes a procedure 316 that performs DMLs on metadata table 304. In particular, in procedure 316, database 104 reads data from metadata source 305 and inserts that data into metadata table 304. Metadata source 305 includes system metadata such as names of data tables, column data types, etc., that are typically user-defined. Metadata source typically includes such system objects as the system data dictionary, etc. Since metadata table 304 is a data table in database 104, the performance of insertion of data into metadata table 304 by procedure 316 causes the generation of redo records that include the inserted metadata, metadata records 318, by the same redo logging mechanism that generates redo records for any data table in database 104. Thus, metadata records 318 are similar in format to other redo records, but different in content. Metadata records 318 include mapping information from internal identifiers for schema objects and their names. Because they are similar in format to redo records, and are generated by the same mechanism, metadata records 318 may be readily included in redo stream 108 along with redo records 314.

In order to distinguish metadata records 318 from redo records 314, metadata records 318 are marked by the logging of a special marker to the redo logging mechanism. Metadata source 305 is locked while it is being read, so that the snapshot of metadata taken can not be changed during the extraction. Thus, a consistent snapshot of the metadata is generated, and this snapshot is consequently reflected, through the redo logging mechanism, in the redo stream.

"Metadata" is information in a database system that describes and defines other data. Metadata information includes data that describes the structure and parameters of tables and data maintained in the system, such as the exact column configuration or column "signature" of database tables. In many database systems, metadata is maintained separately from its associated data and tables, and is collected into a central "data dictionary." Thus, the data dictionary normally contains the foundational data that sets forth the basic structures of storage entities in a database system. When creating a new database table, the schema definition of that new table must be entered in the data dictionary before it is recognized by the system. If the schema definition of a table is changed (e.g., a column is to be added or dropped from the table), the associated metadata for that table must be modified in the data dictionary before the schema change is recognized.

Figure 4:
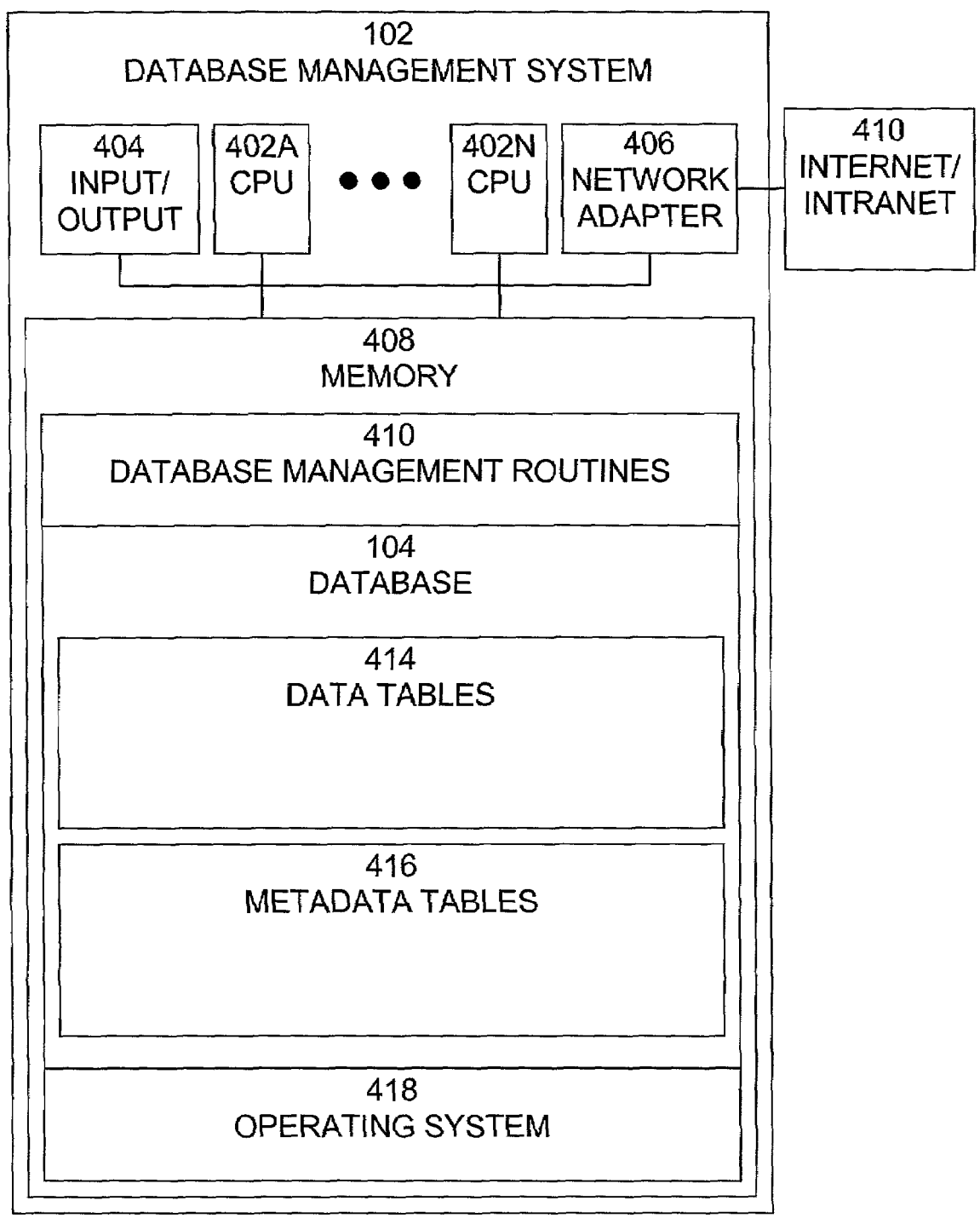
FIG. 4 is an exemplary block diagram of a database management system (DBMS), in which the present invention may be implemented.

An exemplary block diagram of a database management system (DBMS) 102, in which the present invention may be implemented, is shown in FIG. 4. DBMS 102 is typically a programmed general-purpose computer system, such as a personal computer, workstation, server system, and minicomputer or mainframe computer. DBMS 102 includes one or more processors (CPUs) 402A–402N, input/output circuitry 404, network adapter 406, and memory 408. CPUs 402A–402N execute program instructions in order to carry out the functions of the present invention. Typically, CPUs 402A–402N are one or more microprocessors, such as an INTEL PENTIUM® processor. FIG. 4 illustrates an embodiment in which DBMS 102 is implemented as a single multi-processor computer system, in which multiple processors 402A–402N share system resources, such as memory 408, input/output circuitry 404, and network adapter 406. However, the present invention also contemplates embodiments in which DBMS 102 is implemented as a plurality of networked computer systems, which may be single-processor computer systems, multi-processor computer systems, or a mix thereof.

Input/output circuitry 404 provides the capability to input data to, or output data from, database/DBMS 102. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces database/DBMS 102 with Internet/intranet 410. Internet/intranet 410 may include one or more standard local area network (LAN) or wide area network (WAN), such as Ethernet, Token Ring, the Internet, or a private or proprietary LAN/WAN.

Memory 408 stores program instructions that are executed by, and data that are used and processed by, CPU 402 to perform the functions of DBMS 102. Memory 408 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 4, memory 408 includes database management routines 410, database 104, data tables 414, metadata tables 416, and operating system 418. Database management routines 410 include software routines that provide the database management functionality of DBMS 102. Database management routines typically include a database query language interface, such as a Structured Query Language (SQL) interface, a Data Manipulation Language (DML) interface, and database processing routines to carry out the data manipulations specified by the DML. For example, an SQL interface accepts database queries using the SQL database query language, converts the queries to a series of DML statements, calls the database processing routines to perform the series of DMLs, and returns the results of the query to the source of the query.

Database 412 includes a collection of information organized in such a way that computer software can select, store, and retrieve desired pieces of data. Typically, database 412 includes a plurality of data tables, such as data tables 414. A data table is a basic unit of storage in a relational or object-relational database system. Each table typically comprises one or more rows and columns. Each column is typically associated with a column name and a column datatype. A row comprises a set of related column data, and normally corresponds to a single database record.

Database 104 also includes metadata tables 416. Metadata tables 416 include system metadata related to mapping information from internal identifiers for schema objects and their names that has been inserted. The metadata is inserted into metadata tables 304 by the performance of procedure 316.

"Metadata" is information in a database system that describes and defines other data. Metadata information includes data that describes the structure and parameters of tables and data maintained in the system, such as the exact column configuration or column "signature" of database tables. In many database systems, metadata is maintained separately from its associated data and tables, and is collected into a central "data dictionary." Thus, the data dictionary normally contains the foundational data that sets forth the basic structures of storage entities in a database system. When creating a new database table, the schema definition of that new table must be entered in the data dictionary before it is recognized by the system. If the schema definition of a table is changed (e.g., a column is to be added or dropped from the table), the associated metadata for that table must be modified in the data dictionary before the schema change is recognized.

Operating system 418 provides overall system functionality.

As shown in FIG. 4, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. In some systems each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). In other systems, the tasks may communicate and/or operate on one or more portions of shared memory. Multi-process computing is similar to multi-tasking computing, as the terms task and process are often used interchangeably, although some operating systems make a distinction between the two.

Figure 5:
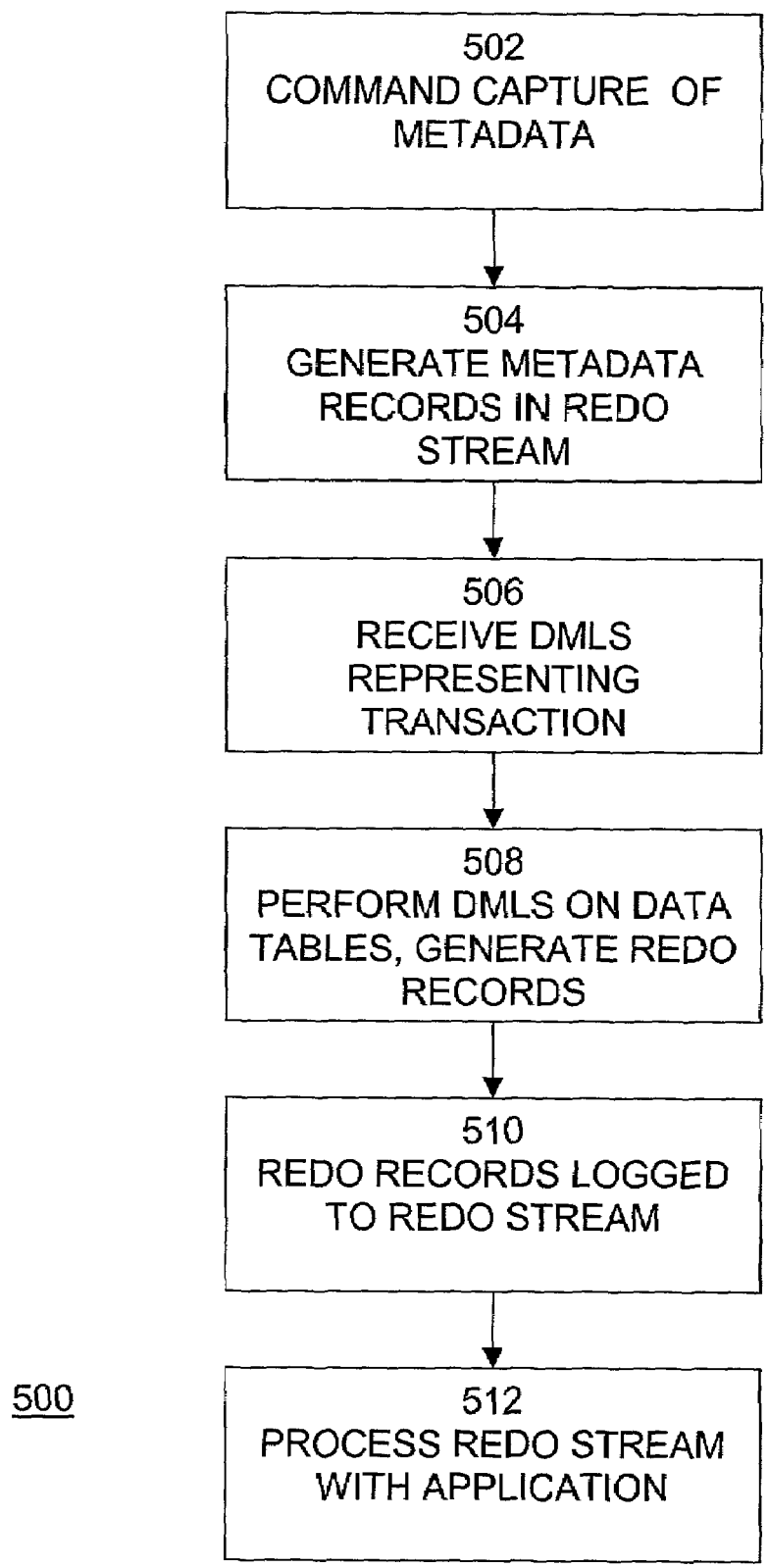
FIG. 5 is an exemplary flow diagram of a process of operation of the present invention.

A process 500 of operation of the present invention is shown in FIG. 5. It is best viewed in conjunction with FIG. 3. Process 500 begins with step 502, in which the DBMS is commanded to capture the metadata to be included in the redo stream. Typically, this command is expressly issued by a user or administrator of the DBMS, but in some cases, the command may be automatically or implicitly issued. In response to the command, in step 504, metadata records are generated and included in the redo stream, as is further described below.

In step 506, DMLs representing a transaction are received by database 104. In step 508, the received DMLs are performed and changes made to data tables, such as data table 302. The performance of the DMLs causes the generation of redo records by the redo logging mechanism. In step 510, the redo records that were generated in step 508 are logged in the redo stream. In step 512, the redo stream is processed, typically using an application. For example, an asynchronously executing application may analyze the captured system metadata from the redo stream and load it into data dictionary tables, which can then be used to supply the needed mapping between identification numbers and user-defined names. Column data type information also may be available.

Figure 6:
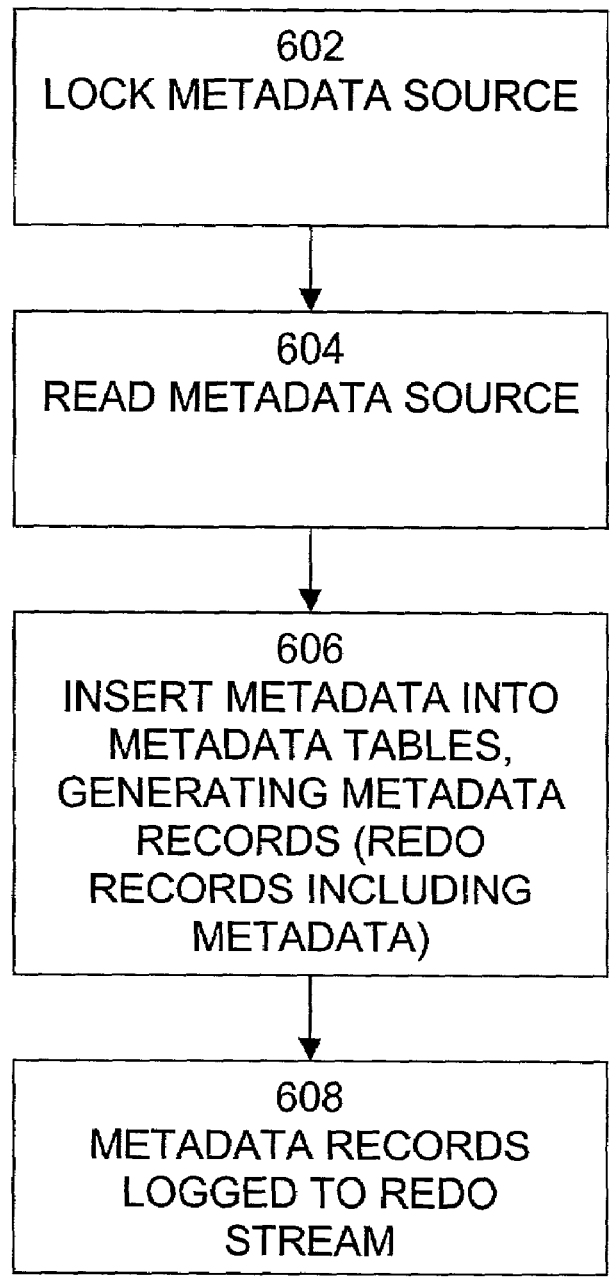
FIG. 6 is an exemplary flow diagram of a sub-process of a step of the process shown in FIG. 5.

A sub-process 600 of step 504 of FIG. 5 is shown in FIG. 6. It is best viewed in conjunction with FIG. 3. Process 600 begins with step 602, in which metadata source 305 is locked so that the snapshot of metadata taken can not be changed during the extraction. Metadata source 305 includes system metadata such as names of data tables, column data types, etc., that are typically user-defined. Metadata source typically includes such system objects as the system data dictionary, etc. In step 604, metadata source 305 is read, that is, metadata is extracted from metadata source 305. In step 606, the metadata extracted from metadata source 305 is inserted into metadata table 304. The insertion of the metadata to metadata table 304 causes the generation of redo records that include the inserted metadata, metadata records 318, by the same redo logging mechanism that generates redo records for any data table in the database. Thus, metadata records 318 are similar in format to other redo records, but different in content. Metadata records 318 include mapping information from internal identifiers for schema objects and their names. Because they are similar in format to redo records, and are generated by the same mechanism, metadata records may be readily included in redo stream 108 along with redo records.

In step 608, metadata records 318 are logged to redo stream 108. In order to distinguish metadata records from the regular redo records, metadata records are marked by the logging of a special marker, redo marker 201, shown in FIG. 2, to the redo logging mechanism.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of communicating data dictionary information of database objects through a redo stream, comprising the steps of:
   logging data dictionary information relating to internal identifier mapping information comprising mapping information from internal identifiers of schema objects of the database to user readable information relating to the schema objects of the database associated with a first database data table to the redo stream, the redo stream comprising a record of all committed and uncommitted changes made to the database objects, wherein the step of logging information relating to internal identifier mapping information associated with the first database data table to the redo stream is performed in connection with the generation of a record for the redo stream and comprises the steps of:
      extracting information relating to internal identifier mapping information associated with the first database data table from a metadata source;
      inserting information relating to internal identifier mapping information associated with the first database data table into a second database data table; and
      logging information representing the information inserted into the second database data table to the redo stream;
   processing a transaction related to the first database data table; and
   logging redo information representing changes to the first database data table caused by processing of the transaction to the redo stream.

2. The method of claim 1, wherein the step of processing a transaction related to the first database data table comprises the steps of:
   receiving data manipulation language statements representing a transaction; and
   performing the data manipulation language statements to cause a change to a first database data table.

3. The method of claim 2, wherein the step of logging redo information representing changes to the first database data table caused by processing of the transaction to the redo stream comprises the steps of:
   generating redo information representing the change to the first database data table; and
   logging the redo information representing the change to the first database data table to the redo stream.

4. The method of claim 3, wherein the user readable information comprises at least one of: a name of a schema object of the database and a datatype of a schema object of the database.

5. The method of claim 3, wherein the information relating to internal identifier mapping information comprises metadata.

6. The method of claim 5, wherein the metadata comprises information relating to mapping information from internal identifiers of schema objects of the database to user readable information relating to the schema objects of the database.

7. The method of claim 6, wherein the user readable information comprises at least one of: a name of a schema object of the database and a datatype of a schema object of the database.

8. The method of claim 3, further comprising the step of: processing the redo stream.

9. The method of claim 8, wherein the step of processing the redo stream comprises the steps of:
   analyzing the information in the redo relating to the information representing the information inserted into the second database data table to generate a data dictionary table; and
   using the data dictionary table to supply a mapping between internal identifiers of schema objects of the database and user readable information relating to the schema objects of the database.

10. The method of claim 9, wherein the user readable information comprises at least one of: a name of a schema object of the database and a datatype of a schema object of the database.

11. The method of claim 10, wherein the information relating to internal identifier mapping information comprises metadata.

12. A system for communicating data dictionary information of database objects through a redo stream comprising:
   a processor operable to execute computer program instructions;
   a memory operable to store computer program instructions executable by the processor; and
   computer program instructions stored in the memory and executable to perform the steps of:
   logging data dictionary information relating to internal identifier mapping information comprising mapping information from internal identifiers of schema objects of the database to user readable information relating to the schema objects of the database associated with a first database data table to the redo stream, the redo stream comprising a record of all committed and uncommitted changes made to the database objects, wherein the step of logging information relating to internal identifier mapping information associated with the first database data table to the redo stream is performed in connection with the generation of a record for the redo stream and comprises the steps of:
      extracting information relating to internal identifier mapping information associated with the first database data table from a metadata source,
      inserting information relating to internal identifier mapping information associated with the first database data table into a second database data table; and
      logging information representing the information inserted into the second database data table to the redo stream;
      processing a transaction related to the first database data table; and
      logging redo information representing changes to the first database data table caused by processing of the transaction to the redo stream.

13. The system of claim 12, wherein the step of processing a transaction related to the first database data table comprises the steps of:
   receiving data manipulation language statements representing a transaction; and
   performing the data manipulation language statements to cause a change to a first database data table.

14. The system of claim 13, wherein the step of logging redo information representing changes to the first database data table caused by processing of the transaction to the redo stream comprises the steps of:
   generating redo information representing the change to the first database data table; and
   logging the redo information representing the change to the first database data table to the redo stream.

15. The system of claim 14, wherein the user readable information comprises at least one of: a name of a schema object of the database and a datatype of a schema object of the database.

16. The system of claim 14, wherein the information relating to internal identifier mapping information comprises metadata.

17. The system of claim 16, wherein the metadata comprises information relating to mapping information from internal identifiers of schema objects of the database to user readable information relating to the schema objects of the database.

18. The system of claim 17, wherein the user readable information comprises at least one of: a name of a schema object of the database and a datatype of a schema object of the database.

19. The system of claim 14, further comprising the step of:
   processing the redo stream.

20. The system of claim 19, wherein the step of processing the redo stream comprises the steps of:
   analyzing the information in the redo relating to the information representing the information inserted into the second database data table to generate a data dictionary table; and
   using the data dictionary table to supply a mapping between internal identifiers of schema objects of the database and user readable information relating to the schema objects of the database.

21. The system of claim 20, wherein the user readable information comprises at least one of: a name of a schema object of the database and a datatype of a schema object of the database.

22. The system of claim 21, wherein the information relating to internal identifier mapping information comprises metadata.

23. A computer program product for communicating data dictionary information of database objects through a redo stream, comprising:
   a computer readable medium;
   computer program instructions, recorded on the computer readable medium, executable by a processor, for performing the steps of
   logging data dictionary information relating to internal identifier mapping information comprising mapping information from internal identifiers of schema objects of the database to user readable information relating to the schema objects of the database associated with a first database data table to the redo stream, the redo stream comprising a record of all committed and uncommitted changes made to the database objects, wherein the step of logging information relating to internal identifier mapping information associated with the first database data table to the redo stream is performed in connection with the generation of a record for the redo stream and comprises the steps of:
      extracting information relating to internal identifier mapping information associated with the first database data table from a metadata source;
      inserting information relating to internal identifier mapping information associated with the first database data table into a second database data table; and
      logging information representing the information inserted into the second database data table to the redo stream;
   processing a transaction related to the first database data table; and
   logging redo information representing changes to the first database data table caused by processing of the transaction to the redo stream.

24. The computer program product of claim 23, wherein the step of processing a transaction related to the first database data table comprises the steps of:
   receiving data manipulation language statements representing a transaction; and performing the data manipulation language statements to cause a change to a first database data table.

25. The computer program product of claim 24, wherein the step of logging redo information representing changes to the first database data table caused by processing of the transaction to the redo stream comprises the steps of:
generating redo information representing the change to the first database data table; and
logging the redo information representing the change to the first database data table to the redo stream.

26. The computer program product of claim 25, wherein the user readable information comprises at least one of: a name of a schema object of the database and a datatype of a schema object of the database.

27. The computer program product of claim 25, wherein the information relating to internal identifier mapping information comprises metadata.

28. The computer program product of claim 27, wherein the metadata comprises information relating to mapping information from internal identifiers of schema objects of the database to user readable information relating to the schema objects of the database.

29. The computer program product of claim 28, wherein the user readable information comprises at least one of: a name of a schema object of the database and a datatype of a schema object of the database.

30. The computer program product of claim 25, further comprising the step of:
processing the redo stream.

31. The computer program product of claim 30, wherein the step of processing the redo stream comprises the steps of:
analyzing the information in the redo relating to the information representing the information inserted into the second database data table to generate a data dictionary table; and
using the data dictionary table to supply a mapping between internal identifiers of schema objects of the database and user readable information relating to the schema objects of the database.

32. The computer program product of claim 31, wherein the user readable information comprises at least one of: a name of a schema object of the database and a datatype of a schema object of the database.

33. The computer program product of claim 32, wherein the information relating to internal identifier mapping information comprises metadata.

* * * * *